Patented May 19, 1942

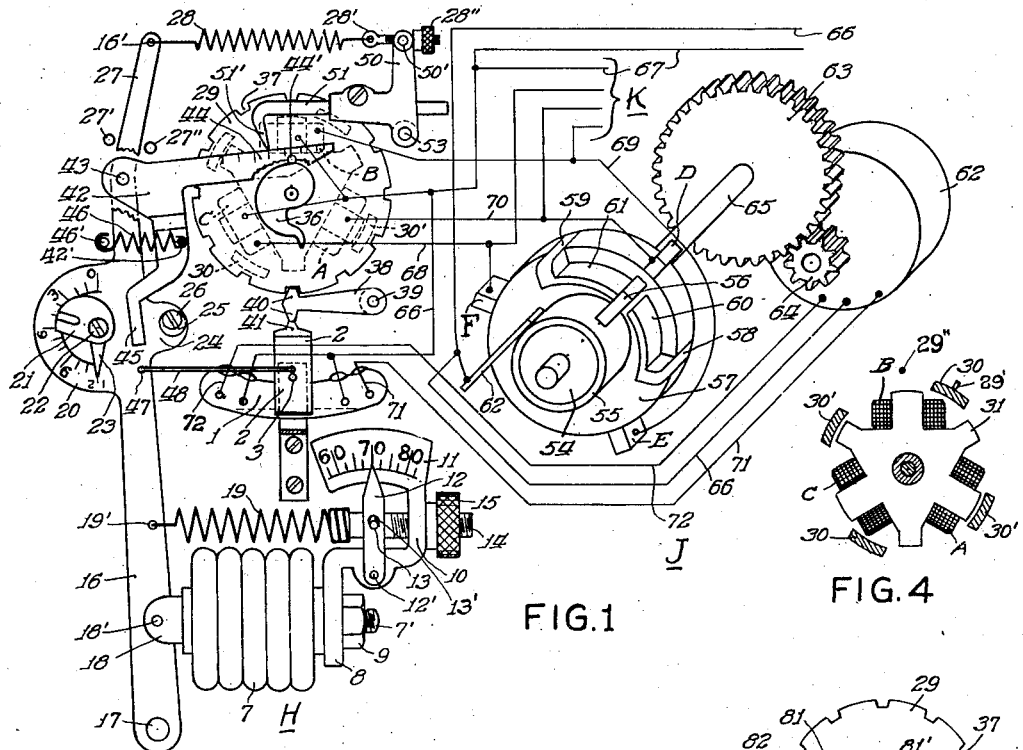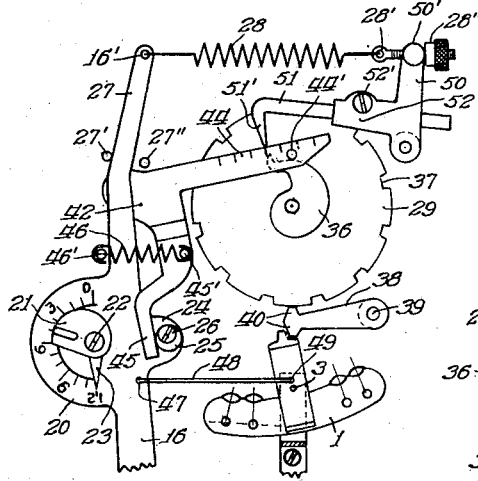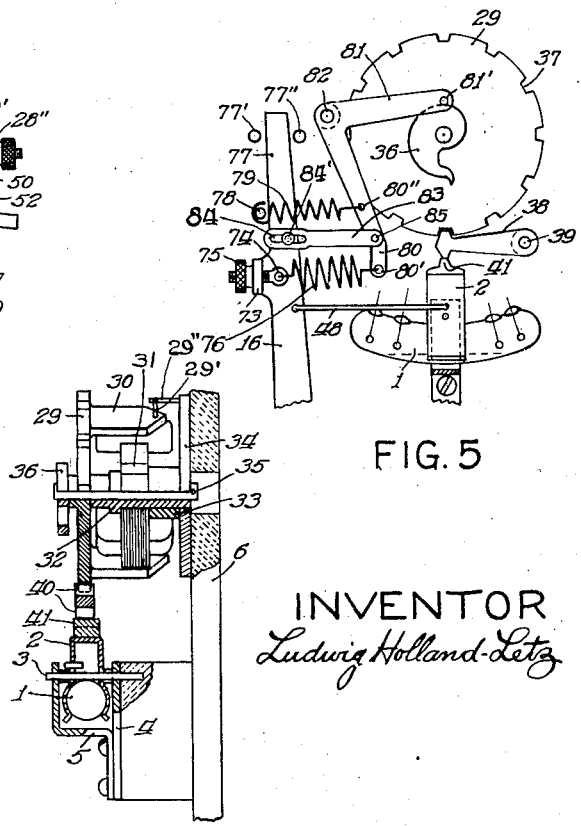

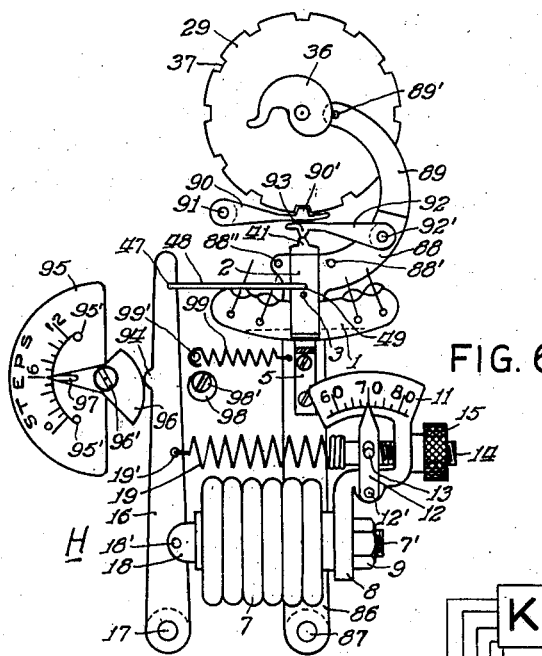

2,283,632

UNITED STATES PATENT OFFICE 2,283,632

AUTOMATIC STEP MOTOR SWITCH LOCKED HEAT REGULATOR

Ludwig Holland-Letz, Crown Point, Ind.

Application March 21, 1940, Serial No. 325,157

20 Claims. (Cl. 236—76)

The present invention relates to automatic heat regulation, primarily for regulation by varying a heating source through a series of uniform stop positions operating between opposite limits and stopping at any such suitable positions that meet the requirements lying within any desired close temperature range; thus, automatically finding correctly calibrated heating positions commensurate with temperature changes, as they arise; instead of the conventional "on or off" heating systems.

One of the important objects of this invention provides for separate isolated simple temperature regulators, pursuantly these embody regulation through the use of a series of uniformly spaced steps operating between predetermined limits controlled from the thermostat by a single thermal switch and power means and establishing certain commensurate calibrated positions that the temperature requirements dictate. These simple temperature regulators are all energized by th same motor driven distributor switch which in turn is controlled by a uniform step thermostat equipped with a step motor locked double throw single pole mercury switch; these individual small simple step motor regulators may be regulating, valves for radiators, heating mains, liquid or gas fuels, or for rheostats, speed reducers, et cetera; these serving to regulate the temperature.

Pursuant to controlling heat by varying a calibrated temperature control mechanism through a series of uniform step by step regulator movement, this invention primarily relates to regulators operated directly from the ordinary lighting system without the use of a transformer and therefore the well known mercury switch may be used or any other sensitive snap switch capable of carrying the line voltage.

Among the numerous significant features of this my automatic heat regulator invention provides for limiting the number of the step motor predetermined limit step travel directly in the thermostat independent of the power operated distributor switch.

A further object of this invention provides adjustment for varying the number of regulator step motor steps directly in the thermostat by simply making a dial change and through the instrumentality of this dial change all the step motors operated regulators and other devices that are in the thermostat circuit are correspondingly effected.

A further object of this invention provides for an automatic heat regulating system adjustment for changing the range of temperature lying within the predetermined limit to limit regulator movement of a series of uniform steps without changing the number of steps or the length of step movement of each step, by changing this adjustment the temperature range of all the step motor regulators in the system are effected.

My Patent No. 2,206,566, issued July 2, 1940, covers low voltage regulation for a predetermined number of a series of uniform steps operating between predetermined limits, in which the thermostat is controlled by a common bi-metal thermal member and which serves only for initiating the start of each step, while in this current invention provisions have also been made for assuring a complete step whereby uniform steps are here made possible by locking the thermostat switch for the duration of each thermostat step motor step this will include all the step motor regulators while they are being energized by the motor driven distributor switch, thus only complete uniform steps are possible for insuring back and forth synchronous step movement of regulators.

It should be understood that while I have shown and described temperature control for regulation of heat, obviously this invention will by the substitution of various responsive elements, control the various kind of conditions, such as humidity, or by proportioning various other kind of mediums; as mentioned, through valves, rheostats, speed changers, or dampers, etc., and is not limited to temperature control.

To further describe my invention more fully reference will be made to the accompanying drawings, in which:

Figure 1 of the drawings is a combined diagram plan view of a step motor locked switch thermostat shown in circuit with a perspective view of the motor operated distributor switch. The thermostat switch is shown in the neutral position. Lead wires for energizing step motor regulators are shown having reference character K.

Figure 2 of the drawings is a partial plan view of the same thermostat shown in Figure 1 but is shown in the midst of a step in progress.

Figure 3 of the drawings is a partial cross section through the vertical center line of step motor and the mercury switch of the thermostat of Figure 1.

Figure 4 of the drawings is a transverse cross section of the thermostat step motor shown through the stator coils and rotor arms.

Figure 5 of the drawings shows a partial diagram plan view of a simplified modification of the Figure 1 thermostat, eliminating both the step adjustment and the temperature range control, as of that thermostat.

Figure 6 of the drawings shows a plan view of another modified form of a step motor switch locking thermostat, it having positive latter movement for thermal circuit breaking compensation to swing mercury switch, including step adjustment for varying the number of steps.

Figure 7 of the drawings shows a partial plan view of the Figure 6 thermostat in the midst of a step.

Figure 8 is a circuit diagram of the thermostat and motor operated distributor switch. It is shown in circuit with two step motor operated valves.

Figure 9 is a longitudinal cross section of the distributor switch of Figure 1 shown just ahead of a contact bar.

Referring to Figures 1 and 3, shows a step forming thermostat control, marked H, it containing the essential mechanism including the responsive member for actuating a switch means for forming uniform steps by the aid of an annular type step motor operating lock means for holding the thermally actuated switch while the step is in progress and for moving the responsive or thermal member or means for forming steps, this switch operates the motor of the power means, marked J, which operates a distributor switch for energizing the above mentioned thermostat motor and any number of step motor operating regulators, marked K, these regulators are used when ever the power means is not directly used for regulating purposes, this thermostat is provided with a well known single pole double throw mercury switch 1, it is held clamped in a yoke 2 in a central balanced position on a pin 3 and to rock freely supported in the forked brackets 4 and 5 which are secured to a raised portion of base 6. The bracket 5 is shown broken away in Figure 1. A gas expansion bellows (responsive means) 7 is provided with a stud 7' and is secured to a bracket 8 with a nut 9, this bracket is secured to the base 6 and is provided with an offset end 10 connected by a right angle continuation and extending upward of which a temperature graduated quadrant 11 is an integral part. A pointer arm 12 is pivoted on the horizontal portion of the bracket on pin 12', this pointer arm is provided with a slotted hole 13' engaging pin 13 which is secured in a temperature adjusting screw 14. This adjusting screw is provided with screw threads passing through a hole in the vertical offset portion of the bracket 10 and made adjustable by a knurled nut 15.

A thermal pressure responsive arm 16 is fulcrumed on pin 17 and is secured to the base 6, not shown in this plan view, a pressure bellows extension 18 is provided with a slotted end for straddling the arm 16 and is hingedly resting against pin 18'. The temperature adjusting screw 14 secures a tension spring 19 the other end of which attaches to arm 16 into hole 19', the adjusting nut 15 serves to vary the desired temperature. The spring 19 is of such strength as to equal the gas pressure as the temperatures indicated.

The near upper end of the arm 16 is provided with a step graduated quadrant 20, an eccentric adjustment 21 is pivotally secured to this quadrant by screw 22, it holding the eccentric just firm enough so as to be movable for adjustment and hold that position in service, a pointer 23 indicates the steps desired. A second side lug 24 adjacent to the right of lug 20 is provided with an eccentric 25 and it is locked with screw 26 to the arm. The latter adjustment serves to correct the position of the quadrant 20 pointer 23 to register the indicated steps. The upper end of the arm is provided with a bent extension 27 and hole 16' for receiving spring 28 which will be explained later.

In my copending patent application (Serial No. 325,156, filed March 21, 1940) of an external rotor step motor invention, it has there been thoroughly described including also the distributor switch and a step motor operated valve, this is the same step motor shown in these various drawing figures, therefore these will here be only briefly described. The rotor disc 29 is provided with four depending arms 30 disposed around the magnetic field of a consequent pole stator 31 which is provided with three coils A, B and C. The stator is provided with a shouldered sleeve 32 in axial alignment therewith and secured in an aperture to a plate 34 interposed by a spacer sleeve 33 to separate the stator from the plate, the assembled stator is then secured with the plate to the base 6. The rotor disc is secured to shaft 35 and is rotatably mounted in the stator sleeve, the shaft projecting above the rotor disc upon which a spiral faced cam 36 is securely mounted, the cam is angularly positioned so that when the cam high point center line is held aligned with the vertical center line and a stator pole, one pair of rotor arms must also come in exact line with the vertical center line stator poles.

The rotor disc periphery is provided with 12 equally spaced notches 37, a latch 38 is fulcrumed on pin 39 secured to base, this latch is provided with a pair of opposing noses 40 one of these noses engaging a rotor disc notch 37 and the other nose resting upon a lug 41 which is secured to the mercury switch clamp 2 serving to hold the switch, when tilted, in that position and thereby simultaneously allowing the step motor to be freely rotated when the latch nose 40 has dropped down out of the rotor disc notch 37.

A bell crank 42 is fulcrumed on pin 43 which is secured to the base 6, the bell crank is provided with a graduated extension 44 and a pin 44' projecting downward near its outer end for riding the cam surface 36, a lower offset right angle extension finger 45 and which is also offset outward in a higher plane than the pivot portion so as to straddle the arm 16 is able to operatively engage either of the stops 21 or 25. A tension spring 46 is attached to the right angle extension of bell crank 42 on pin 42' and is held tensioned on pin 46' which is secured to the base, this spring serves to hold the bell crank with the pin 44' riding the cam 36 under a light pressure. The arm 16 is provided with a small hole 47 adjacent the step adjusting quadrant for receiving connecting link 48, the switch clamp 2 is provided with a small hole 49 close to and radially aligned with the pivot hole 3 for receiving the other end of the link so that with the least amount of swing of the arm 16 through the aid of the connecting link 48 will result in rocking the mercury switch and will shift the mercury and cause circuit contact to be made at either of the pair of terminals. The connecting link 48 is shown made of any suitable high tensile strength wire having right angle bends at each end, these ends fitting the respective holes snugly without play yet free to oscillate. The upper bent end 27 of the arm 16 is provided with two stop pins 27' and 27" for limiting the swing of the arm to that of the necessary mercury switch rock for making opposed circuits and so that no injury will occur while in operation.

An adjustable rocker arm 50 is fulcrumed on pivot 53, this arm is provided with a hollow right angle extension 52 for adjustably supporting a sliding rest bar 51 having a finger bent downward at right angle for resting on the graduated bell crank 44, the spring 28 is attached to end 27 of arm 16, the other end of the spring is attached to eye bolt 28', the upper end of the rocker arm is provided with a cylindrical portion 50' having a hole in parallel alignment with the extension 52 for receiving the eye bolt and with a knurled nut 28", the spring is tensioned to compensate for the gas pressure difference for each step movement of the step motor to reset the mercury switch into neutral position.

The step motor is energized by a distributor switch operated by a reversing motor 62, this motor is provided with pinion 64 which drives gear 63 secured to a shaft 65 supported in suitable journals, not shown. A contact drive arm 56, an integral part of sleeve 55, is provided with a nonconducting bushing 54 and is secured to the shaft. A distributor disc 57 made of nonconducting material is provided with a pair of transversed slots set at 120 degree spacing in its periphery into which a pair of bars 58 and 59 are embedded, forming a smooth periphery surface, these bars are provided with integral interposing segments 60 and 61 respectively the ends of which form a slot somewhat wider than the thickness of the drive arm 56, so that contact is made on the driving side of the arm only and free enough so as not to cause an electrical arc on the open side. Disposed equally spaced around the distributor disc are three brushes D, E and F which are suitably secured in the housing, not shown, and are resiliently mounted so as to ride the disc pressured and causing just enough friction so as to assure a good firm contact between the drive arm 56 and 60 or 61.

A brush 62, riding the outer end of the sleeve 55 and connects one side of the electric circuit with the step motors and motor 62 with line 66, the brush F through lead 68 is in circuit with stator coil C, brush E through lead 69 is in circuit with stator coil B and the brush D through lead 70 is in circuit with stator coil A. The motor 62 is in circuit with line 66 and leads 71 and 72 serve for the reversed operation of the motor to the mercury switch opposed terminals, these terminals will be known by these same lead numbers, the cooperating switch terminals are in circuit with line 67 which also completes circuit to the step motor stator coils.

Having described this thermostat control and the motor driven distributor switch construction, the operation in general will now be described; assuming that a rise in temperature had taken place, the expansion bellows 7 would have forced the arm 16 to the left and through the connecting link 48 caused the mercury switch 1 to rock counterclockwise and tilt taking a position as shown in Figure 2, this allows the nose 40 of latch 38 to drop out of the rotor disc notch 37 and in front of lock lug 41 and through line 72 energize the motor 62 to rotate the large gear counterclockwise assuming that the motor was so wired, this large gear being secured to the shaft will drive the drive arm 56 and with it the distributor disc 57 clockwise until the bar 59 contacts brush F this will energize coil C and cause this stator pole to attract the pair of rotor bar 30 nearest and cause the step motor rotor disc to rotate one step clockwise and with it the spiral cam 36 and force the pin 44' of bell crank arm 44 up against the finger 51' this will cause the arm 16 again to be pulled back against the bellows 7, at completion of the step the latch 38 will be forced back up into another rotor disc notch by the switch lock lug 41 through the connecting link 48 allow the switch to tilt back and break circuit and the motor 62 will come to a stop. It must however be understood that provisions must be made so that the motor 62 will have enough overrun to allow the distributor bar to pass by the brush F sufficiently to again safely open the circuit to the step motor.

Now if another raise in temperature took place the same cycle of operation would take place and brush E would be contacted by the bar 59 and coil B will attract a pair of rotor arm 39' resulting in another step motor step clockwise, and the distributor bar 59 would have the approximate position shown in the drawings held by bar 58, now if the temperature has fallen the arm 16 will retreat and cause the mercury switch to rock clockwise, allowing the latch 38 to fall, starting the motor 62 and the gear 63, the latter rotating in the clockwise direction, driving the arm 56 contacting segment 60, which is a unit of bar 58, will now be located between brushes E and F and therefore this bar 58 will contact brush F again and through lead 68 energize coil C again and return the rotor through arms 30 one step back again permitting the switch to come back to neutral and the motor 62 come to a stop. It will be noted that with this distributor switch, only one pair of poles are energized, which results in holding a rotor arm comes squarely in line with a stator pole to a firm sharply positioned step with no possible spin or oscillation taking place, as is common with the conventional distributor switch. It will be noted that the rotor arms outer ends terminate to a symmetrical angular V point, these will aid the rotor arms to register with the respective stator poles in sharp central alignment.

There will be 12 steps made with a four arm rotor when three pair of stator poles are used, the spiral cam 36 shown is limited to one revolution, however this cam could be a scroll and rotate any number of times, it is obvious that an eight arm rotor would make 24 steps. This thermostat just described operates through a limit of 12 steps, when the last step is being made, as is shown in Figure 2, the finger 45 is engaging the stop 25 through the cam 36 pressure on pin 44' is forcing the mercury switch lock lug 41 against the latch nose 40 so that on completion of the step motor step the switch will come back to neutral position; it should be understood that there is enough resilience in the various parts to permit this cam pressure to accumulate and will not cause injury to these parts due to this pressure. It is now obvious that any further pressure from the thermal expansion bellows can cause no further movement to the switch to cause any further movement of either the distributor operating motor or the step motor in the latter direction since the stop 25 is resting against the finger 45 and hence upon pin 44' engaging cam 36 and which forms a rigid stop for arm 16.

Now if 12 steps were made in the opposite direction, the step motor and cam will cause the finger 45 to reach the step adjusting cam 21 and stop any further retreating movement to arm 16 because the bell crank is held taut by spring 46 against cam 21 with sufficient pressure to resist any such arm 16 retreating movement. It can now be clearly seen that by turning the eccentric cam indicator at any of the 12 graduated step positions, will limit the movement of the step motors to that number of steps in that direction; the step motor leads 68, 69, 70 and 67 are shown extended so that any number of step motor operated regulators may be connected in those circuits, for instance, referring to the diagram of Figure 8 showing the thermostat control H, motor operated distributor switch J and two step motor operated valve regulators K having leads numbered the same as in Figure 1, if the step indicator was pointed at 12 steps, the valve would be opened to its open position, and if it was changed to say, 4 steps the valves would open up only ¼ way or 4 steps, all the step motors are effected and will keep in synchronous step with one another.

Referring to the sliding finger arm 51 it will be seen that by sliding the bar out of the rocker toward the bell crank fulcrum 43 will result in adding very little more additional spring pressure upon arm 16 for each step, due to the cam 36 lead raise to compensate for the difference of the expansion bellows 7, this pressure change represents a certain temperature change and therefore it will require a less change in the temperature to cause the 12 step movement of the step motor to act; thus resulting in a very close temperature range and the opposite is true when the finger bar is slid inward, a greater temperature range change will result for the 12 step operation; because of the longer action of spring 28.

A simplified modification of the thermostat control just described is shown in Figure 5, neither the step adjustment nor the temperature range adjustment are used in this design. The step motor, cam, mercury switch, locking latch, switch throw connection and lower end of the thermal arm 16, thermal bellows and bracket with temperature change quadrant all are the same as in Figure 1. The arm 16 near upper end 77 is provided with an ear 73 extending upward which is provided with a small hole to receive an eye bolt 74 in threaded engagement with nut 75, this eye bolt is attached to spring 76, the upper end 77 of the arm interposes a pair of stop pins 77' and 77'' secured to the base these serving to limit the movement of the arm and to that of the interconnected mercury switch tilting movement.

A bell crank 81 is fulcrumed on pin 82 secured to base, not shown, the outer end of the horizontal portion of bell crank is provided with a pin 81' projecting from the lower side so as to ride upon the spiral cam 36, the right angle extension end 80 is provided with a hole 80' for receiving the other end of the spring 76 mentioned above, located in the extension 80 about half way distance from the center a second hole 80'' for receiving a spring 79 which in turn is attached under tension to pin 78 secured to the base, this spring serves to keep the bell crank pin 81' tautly riding the cam 36 for the same purpose as spring 46 in the above described thermostat. A limit travel link 83 pivotally attached to the bell crank extension to pivot 85, the other end of the link is provided with an elongated slot 84 for traversing on pin 84', this link serves as a limit stop for the travel of the step motors to 12 steps, performing the same function as stops 25 and 21 of Figure 1, but are not adjustable. The operation of this thermostat is also the same as that of Figure 1 just described and therefore need no further explanation, the adjusting nut 75 also serves the same purpose as that explained for 28'' of Figure 1.

Having now described my line voltage step motor switch lock thermostat which are provided with spring actuated circuit breaker, Figure 6 of the drawings show another thermostat modification, in this thermostat as in the above the step progress is assured by locking means resulting in uniform steps, but here the circuit breaking (contact separation) is by direct action and not through the use of a spring. This thermostat also embodies the same kind of step limit control feature of Figure 1 thermostat.

The step motor and cam, switch and clamp yoke, and the entire thermal expansion bellows assembly including the temperature adjustment and the lower end of the thermal arm 16 all these are as of the aforesaid thermostat. A switch supporting arm 86 is fulcrumed on pivot 87 secured to base, not shown, the double throw single pole mercury switch 1 is pivotally supported by pin 3 in the offset bracket 5 which is secured to the switch arm 86 both are provided with holes for the purpose, the upper end of the switch arm 86 is provided with an arcuate end 88 this arcuated end is provided with a sharp outward offset 89 about midway of the semi-circular plane face, the upper end is provided with a pin 89' projecting upward for riding the cam 36.

A rotor disc pawl 90 is provided with an upward projecting nose 90' is fulcrumed on pin 91 secured to the base, the nose of the pawl aligning with the rotor disc 29 for engaging notches 37, a latch 92 is hingedly fulcrumed on the arcuated end of the arm 86 at 88 on pin 92', the latch 92 is provided with a nose 93 for engaging switch lock lug 41 secured to the switch clamp yoke 2 same as in the aforesaid thermostats, the latch and the pawl both are aligned with each other and are provided with outer extended ends so that when the arm 86 is swung to the right or left extremes they will still retain their cooperative function so that the pawl 90 will prevent the latch 92 from releasing the switch only when a rotor notch is in line with the pawl. Stop pins 88' and 88'' secured in arm 86 adjacent the upper end of switch clamp 2 serve to limit the latter to the proper tilt for the mercury flow to contact either of the opposing pair of terminals.

The thermal expansion bellows arm lower end is the same as 16 of former designs, towards the upper end of this arm a round nose lug 94 is provided for engaging an eccentric step adjusting cam 96 having a pointer 97, this cam 96 is secured to a segmental dial 95 by screw 96', the dial is secured to the base, the cam 96 should be held securely enough to the segmental dial so as to be adjustable by hand and not become displaced in service, it is obvious that other locking means could be employed, such as by spring held notches, etc. The upper end of the thermal arm is provided with a small hole 47 for receiving the link 48 and connecting it with the switch clamp yoke 2 the same as described in the other thermostats. An adjustable thermal arm stop 98 secured to the base with screw 98' serves to limit the step motor rotor travel in the clockwise direction, it is adjustable for making corrections so as to bring a rotor arm in line with a stator pole when the switch is in the neutral position, and the eccentric dial cam 96 will govern the number of counterclockwise step motor steps to the maximum of 12 steps, the maximum predetermined limit.

A spring 99 is attached in a hole provided therefore in the arm 86 adjacent the switch and the other end of which is tensioned upon pin 99' this serves to keep the arm 86 drawn taut with the pin 89' riding the cam 36 and in addition to keep cooperating movement with the thermal arm 16 for breaking the switch circuit at the completion of each uniform step and bring the switch back into neutral position.

Briefly redescribing this thermostat operation, no electrical circuits are shown in this diagram of Figure 6 since they are the same as of Figure 1, when a thermal signal is received; say, a retreat of the thermal arm 16 the switch will be tilted clockwise, as shown in Figure 7, the latch 92 will fall, with the nose 93 locking lug 41 of the switch clamp, and the pawl 90 will simultaneously drop with it out of the notch 37, the step motor is then free to be moved when the distributor switch energizes a certain stator coil and cause it to move one step in the clockwise direction, the cam 36 will have moved the switch arm 86 to the right and through the pull action on link 48 will bring the tilted switch back into the neutral, this cycle of operation could be carried on until the thermal arm movement is stopped by stop 98, this will prevent another switch tilt that might be forthcoming from further retreat of the thermal arm. The step motor movement in the opposite direction would be limited by the adjustable eccentric cam 96 stopping the left movement of the arm and that of the step motor to the step indicated on the dial 95, as above stated.

The step motor shown will make 12 steps, as above stated; less number of steps are made by changing the dial to the number of steps desired, it will be seen that the step motor must be in the extreme clockwise position if the dial pointer is to be freely moved to the 0 step, which would be the starting or closed position of a step motor operated valve; if the step motor, which also governs the arm 16 position, is in any other position the arm 86 through link 48 will be moved to the right with the pin 89' lifted off of cam 36, after which it will operate to correspond to the adjusted position.

As above stated, either temperature or conditioning by various other mediums may be controlled by the step motor operated valve regulators K shown in Figure 8, might be regulating valves; for heating mains or radiators, or they might be regulating liquid fuel to burners, gas fuel, or they may be regulating rheostat, or speed reducers, et cetera.

I have now shown several different designs of step motor operated step locked switch controls for producing a series of uniform steps. Through this step lock, when a step has started, it must proceed uninterruptedly to a definite step position regardless of how far the step has advanced when thermal relief occurs. Any cessative thermal action remains ineffective until completion of the step; such uniform steps are very important when a plurality of such step motors are in the same circuit and controlled by one thermostat, they must be kept in exactly the same step by step movement, operating back and forth, stop at any stop position, take any new position, and do this constantly and still remain in step; to do this, it is imperative that only complete, sharply positioned step movement will suffice; this is made possible through this aforedescribed step motor step switch lock thermostat invention.

The motor driven distributor switch serves for energizing the thermostat step motor and the regulator step motor system, however, this distributor shaft 65 can be used for regulating purposes instead of step motor operated regulators if so desired by various mechanical means such as crank arms, gearing, belts, wire in a tube, etc.

It will be seen that each of the step motor cams are shown provided with stops for limiting the two opposite operating positions, each step motor operated regulator is also provided with step limiting stops 29'' stop pin secured to plate 34 and pin 29' secured to rotor arm end, these stops serve the purpose so that if for some reason any of the step motors rotors of a system should drop out of step, they will become self-correcting in the course of operations up to their limits.

The step motor external rotor arms 30 depending from the disc 29 are shown with its ends terminating to a symmetrical angular V point in parallel alignment with its center line, this serves to increase its sharp rigid position registering ability over the respective stator poles. These rotor arms are of an arcuated cross section conforming closely with the periphery of the stator poles for traversing this external magnetic field.

For clarity reasons the step motor rotor cams among other parts as shown in the drawings have been exaggerated out of proportion for clarity purposes. The step motors shown in these drawings are of the annular type, they are efficient and operate silently; however, it is obvious that electro-magnet ratchet propelled reversing step motors are very simple and can be used if so desired.

I have now shown and described several modifications of this present invention and I am aware that various modifications and changes may be made in this invention by those skilled in the art and therefore am only to be limited in accordance with the scope of the appended claims.

I claim as my invention:

1. The combination with a heat control system, power means, heat regulating means adapted to be moved back and forth by said power means between predetermined limits constituting a predetermined number of a series of equally divided stepped positions, thermal responsive means, switch means, said switch means connected to and moved by said thermally responsive means for operating said power means in either direction, locking means, means operated by said power means for moving said locking means, said power means to operate said locking means for locking said thermal responsive means against movement for insuring the operation of said power means and said regulating means through one of said series of equally divided stepped positions, and switch opening means, said switch opening means operated by means operated by said power means for determining said equal steps.

2. In a control system, including responsive means, regulating means, and power means adapted to move said regulating means back and forth between predetermined limits constituting a predetermined number of a series of equally divided stepped positions, switch means, connecting means for keeping unison movement between said switch means and said responsive means, locking means, means operated by said power means for moving said locking means, said responsive means to move said switch means for operating said power means for moving said locking means for stopping said responsive means switch movement for insuring said switch means to operate said power means and said regulating means through one of said equally divided stepped positions, and compensating means, means operated by said power means for operating said compensating means for restoring said responsive means to normal position for determining said equal steps.

3. In a control system, including responsive means, regulating means, and power means adapted to move said regulating means back and forth between predetermined limits constituting a predetermined number of a series of equally divided stepped positions, switch means connected to and moved by said responsive means, locking means, a step motor for operating said locking means, step motor energizing means, said responsive means to move said switch means for operating said power means for operating said energizing means for operating said step motor for locking said responsive means switch movement for insuring said switch means to operate said power means and said regulating means through one of said equally divided stepped positions, and compensating means, said compensating means operated by said step motor for restoring said responsive means to normal position at completion of said equal steps.

4. In a control system, including responsive means, regulating means, and power means adapted to move said regulating means back and forth between predetermined limits constituting a predetermined number of a series of equally divided stepped positions, switch means connected to and moved by said responsive means, locking means, a step motor operating said locking means, step motor energizing means, said responsive means to move said switch means for operating said power means for operating said energizing means for operating said step motor locking said responsive means switch movement for insuring the operation of said power means and said regulating means through one of said equally divided stepped positions, and means moved by said step motor for effecting said responsive means position during each of said equal steps for opening said switch means for stopping said power means at the completion of any one of said equal steps.

5. In a control system, including responsive means, regulating means, and power means adapted to move said regulating means back and forth between predetermined limits constituting a predetermined number of a series of equally divided stepped positions, switch means connected to and moved by said responsive means, locking means, a step motor operating said locking means, step motor energizing means, said responsive means to move said switch means for operating said power means for operating said energizing means for operating said step motor locking said responsive means switch movement for insuring the operation of said power means and said regulating means through one of said equally divided stepped positions, means moved by said step motor for effecting said responsive means position during each of said equal steps for opening said switch means for stopping said power means at the completion of any one of said equal steps, and means for changing the amount of said movement effecting said responsive means without changing the predetermined number of steps.

6. In a control system, including responsive means, regulating means, and power means adapted to move said regulating means back and forth between predetermined limits constituting a predetermined number of a series of equally divided stepped positions, switch means moved by said responsive means, locking means, a step motor operating said locking means, step motor energizing means, said responsive means to move said switch means for operating said power means for operating said energizing means for operating said step motor locking said responsive means switch movement for insuring the operation of said power means and said regulating means through one of said equally divided stepped positions, and resilient means moved by said step motor for effecting said responsive means position during each of said equal steps for opening said switch means for stopping said power means at the completion of any one of said equal steps.

7. In a control system, including responsive means, regulating means, and power means adapted to move said regulating means back and forth between predetermined limits constituting a predetermined number of a series of equally divided stepped positions, switch means moved by said responsive means, locking means, a step motor operating said locking means, a distributor switch, said responsive means to move said switch means for operating said power means for operating said distributor switch for energizing said step motor locking said responsive means switch movement for insuring the operation of said power means and said regulating means through one of said equally divided stepped positions, and camming means moved by said step motor for effecting said responsive means position during each of said steps for stopping said power means at the completion of any one of said equal steps.

8. In a heating system, including thermal responsive means, regulating means, and power means adapted to move said regulating means back and forth between predetermined limits constituting a predetermined number of a series of equally divided stepped positions, switch means actuated by said thermal responsive means, locking means, a distributor switch having a selector member, an electric step motor having at least three stator coils for operating said locking means, electrical connections between said distributor switch and said stator coils, said selector member to change stator coil circuits upon reverse movement of said distributor switch, said thermal responsive means to operate said power means for operating said distributor switch energizing said step motor for locking said responsive means switch movement for insuring the operation of said power means and said regulating means through one of said equally divided stepped positions, and means moved by said step motor for effecting said thermal responsive means position during each of said equal steps for opening said switch means for stopping said power means at the completion of any one of said equal steps.

9. In a control system, including responsive means, regulating means, and power means adapted to move said regulating means back and forth between predetermined limits constituting a predetermined number of a series of equally divided stepped positions, switch means actuated by said responsive means, locking means, a distributor switch, said distributor switch provided with a pair of interposing contacts, a selector member, an electric step motor having at least three stator coils for operating said locking means, electrical connections between said distributor switch and said stator coils, said switch means to operate said power means for operating said distributor switch and said selector member to change circuits to different stator coils upon reverse movement of said distributor switch by selecting either one of said interposing contacts, said distributor switch energizing said step motor for locking said responsive means switch movement to insure the operation of said power means and said regulating means through one of said equally divided stepped positions, and means moved by said step motor for effecting said responsive means position during each of said equal steps for opening said switch means for stopping said power means at the completion of any one of said equal steps.

10. In a control system, including responsive means, regulating means, and power means adapted to move said regulating means back and forth between predetermined limits constituting a predetermined number of a series of equally divided stepped positions, switch means actuated by said responsive means, locking means, a distributor switch provided with a pair of interposing contacts including a frictionally resisted member for selecting either of said interposing contacts, an electric step motor having at least three stator coils for operating said locking means, electrical connections between said distributor switch and stator coils, said selector member to change circuits to different stator coils upon reverse movement of said distributor switch by selecting either one of said interposing contacts, said responsive means to operate said power means for operating said distributor switch for energizing said step motor locking said responsive means switch movement to insure the operation of said power means and said regulating means through one of said equally divided stepped positions, and means moved by said step motor for effecting said responsive means position during each of said equal steps for opening said switch means for stopping said power means at the completion of any of said equal steps.

11. In a heat control system, including thermal responsive means, regulating means, and power means adapted to move said regulating means back and forth between predetermined limits constituting a predetermined number of a series of equally divided stepped positions, a switch means comprising a pair of contacts cooperating with contact means, locking means, a step motor for operating said locking means, a distributor switch, said thermal responsive means to move said switch means to contact with either one of said pair of contacts for reversed operation of said power means for operating said distributor switch energizing said step motor for locking either of said pair of cooperating contacts to insure the operation of said power means and regulating means through one of said equally divided stepped positions, and contact opening means, said contact opening means operated by said step motor for separating said contacts after said locking means releases said switch means.

12. In a control system, including responsive means, regulating means, and power means adapted to move said regulating means back and forth between predetermined limits constituting a predetermined number of a series of equally divided stepped positions, a switch means comprising a pair of contacts cooperating with contact means, locking means, a distributor switch having a selector member, an electric step motor having at least three stator coils for operating said locking means, electrical connections between said distributor switch and said stator coils, said selector member to change stator coil circuits upon reverse movement of said distributor switch, said responsive means to operate said power means for operating said distributor switch for energizing said step motor for locking either of said pair of cooperating contacts to insure the operation of said power means and said regulating means through one of said equally divided stepped positions, and means moved by said step motor for effecting said responsive means position during each of said equal steps for opening said switch means for stopping said power means at the completion of any of said equal steps.

13. In a control system, including responsive means, regulating means, and power means adapted to move said regulating means back and forth between predetermined limits constituting a predetermined number of a series of equally divided stepped positions, switch means moved by said responsive means for making circuit with said power means, a distributor switch, indexing lock means, an electric step motor operating said indexing lock means, said responsive means to operate said power means for operating said distributor switch for energizing said step motor operated indexing lock means for cooperating with said switch means for holding said switch means to insure operation of said power means and said regulating means through one of said equally divided stepped positions, and means moved by said step motor for changing the responsive means position while said equal step is progressing for opening said switch means circuit for stopping said power means at the completion of any of said equal steps.

14. In a control system, including responsive means, regulating means, and power means adapted to move said regulating means back and forth between predetermined limits constituting a predetermined number of a series of equally divided stepped positions, switch means moved by said responsive means for making circuit with said power means, a distributor switch, a radially disposed equiangular indexing lock means, an electric step motor operating said indexing lock means, said responsive means to operate said power means for operating said distributor switch for energizing said step motor operated indexing lock means for holding said switch means to insure operation of said power means and said regulating means through one of said equally divided stepped positions, and resilient means moved by said step motor for changing said responsive means position while said step is advancing for opening said switch means circuit for stopping said power means when any of said equal steps are complete.

15. In a heat control system, including thermal responsive means, regulating means, and power means adapted to move said regulating means back and forth between predetermined limits constituting a predetermined number of a series of equally divided stepped positions, switch means moved by said thermal responsive means, locking means, a distributor switch having a selector member, an electric step motor having at least three stator coils for operating said locking means, an external rotor journaled on said stator axis, said rotor having a radially disposed member provided with depending arms for traversing said stator magnetic field, the end of said rotor arms terminating to a symmetrical angular V point, electrical connections between said distributor switch and said stator coils, said selector member to change stator coil circuits upon reverse movement of said distributor switch, said thermal responsive means to operate said power means for operating said distributor switch for energizing said step motor, locking said switch means to insure the operation of said power means and said regulating means through one of said equally divided stepped positions, and movable means operated by said step motor as the step progresses for breaking said switch means circuit at completion of any of said equal step movements.

16. In a control system, including responsive means, regulating means, and power means adapted to move said regulating means back and forth between predetermined limits constituting a predetermined number of a series of equally divided stepped positions, switch means moved by said responsive means, means for locking said responsive means switch movement, means operated by said power means for moving said locking means, said responsive means to move said switch means to operate said power means for operating said locking means to insure said switch means to operate said power means through one of said equally divided stepped positions and simultaneously operate said regulating means, movable means operated by said power means for changing said responsive means position while said step is in progress for opening said switch means circuit for stopping said power means when any one of said steps are completed, and stop means for limiting said responsive means range of movement to equal the back and forth movement of said power means and said regulating means to equal said predetermined limits and said number of steps.

17. In a control system, including responsive means, regulating means, and power means adapted to move said regulating means back and forth between predetermined limits constituting a predetermined number of a series of equally divided stepped positions, switch means moved by said responsive means, means for locking said responsive means switch movement, means operated by said power means for moving said locking means, said responsive means to move said switch means to operate said power means for moving said locking means to insure said switch means to operate said power means through one of said equally divided stepped position and simultaneously operate said regulating means, movable means operated by said power means for changing said responsive means position while said step is in progress for opening said switch means circuit for stopping said power means when any of said steps are complete, stop means for limiting said responsive means range of movement to equal the back and forth movement of said power means and said regulating means to equal said predetermined limits and said number of steps, and means for changing said stop means for stopping said responsive means movement range to a different range of predetermined movement limit and number of steps of said power means and said regulating means.

18. In a control system, including responsive means, regulating means, and power means adapted to move said regulating means back and forth between predetermined limits constituting a predetermined number of a series of equally divided stepped positions, switch means moved by said responsive means, locking means, an electric step motor for operating said locking means, a distributor switch, electrical connections between said distributor switch and said step motor, said responsive means to move said switch means for operating said power means for operating said distributor switch for energizing said step motor for locking said switch means to insure operation of said power means and said regulating means through one of said equally divided stepped positions, and means moved by said step motor for changing said responsive means position during the progress of each equal step for opening said switch means circuit for stopping said power means at the completion of any one of said equal steps, additional regulating means comprising an electric step motor, means for operating said regulating means by said step motor, electrical connections between said distributor switch and and said step motor operated regulator for operating said regulating means back or forth during each equal step of movement in unison with said power means.

19. In a control system, including responsive means, regulating means, and power means adapted to move back and forth between predetermined limits constituting a predetermined number of a series of equally divided stepped positions, switching means moved by said responsive means, locking means, an electric step motor for operating said locking means, a distributor switch, electrical connections between said distributor switch and said step motor, said responsive means to move said switching means for operating said power means for operating said distributor switch for energizing said step motor locking said switching means to insure operation of said power means through one of said equally divided stepped positions, means moved by said step motor for changing said responsive means position during the progress of each of said equal step for opening said switching means for stopping said power means at the completion of any of said equal steps, said regulating means comprising a plurality of regulators each having an electric step motor, means for operating each of said regulators regulating means by said step motors, electrical connections between said distributor switch and said step motors for operating said plurality of regulators back or forth during each equal step of movement in unison with said power means.

20. In a control system, including responsive means, regulating means, and power means adapted to move back and forth between predetermined limits constituting a predetermined number of a series of equally divided stepped positions, switch means moved by said responsive means, locking means, a plurality of step motors, a distributor switch, electrical connections between said distributor switch and said plurality of step motors, one of said step motors cooperating with said locking means for locking said switch means, said regulating mean operated by others of the plurality of step motors, said responsive means to move said switch means for operating said power means operating said distributor switch for energizing said plurality of step motors one of which for moving said locking means for locking said switch means for insuring operation of said power means and the operation of said step motor operated regulating means through one of said equally divided stepped positions, and means moved by the said one of said plurality of step motors for changing said responsive means position during the progress of each equal step for opening said switch means circuit for stopping said power means at the completion of any one of said equal steps.

LUDWIG HOLLAND-LETZ.